United States Patent
Hirano et al.

(10) Patent No.: US 6,346,893 B1
(45) Date of Patent: Feb. 12, 2002

(54) AUTOMOTIVE NAVIGATION SYSTEM

(75) Inventors: Hideaki Hirano, Sagamihara; Shoichiro Morita, Zama; Toru Saito, Yamato, all of (JP)

(73) Assignee: Xanavi Informatics Corporation (JP)

( * ) Notice: Subject to any disclaimer, the term of this patent is extended or adjusted under 35 U.S.C. 154(b) by 0 days.

(21) Appl. No.: 09/341,728

(22) PCT Filed: Jan. 12, 1998

(86) PCT No.: PCT/JP98/00073

§ 371 Date: Jul. 14, 1999

§ 102(e) Date: Jul. 14, 1999

(87) PCT Pub. No.: WO98/30871

PCT Pub. Date: Jul. 16, 1998

(30) Foreign Application Priority Data

Jan. 14, 1997 (JP) ............................................. 9-004638

(51) Int. Cl.[7] .............................................. G08G 1/123
(52) U.S. Cl. ...................... 340/995; 340/990; 340/988
(58) Field of Search ................................ 340/995, 990, 340/988; 701/200, 201, 206, 208, 211

(56) References Cited

U.S. PATENT DOCUMENTS

| | | | | |
|---|---|---|---|---|
| 4,992,947 A | * | 2/1991 | Nimura et al. ............... | 340/995 |
| 5,414,629 A | * | 5/1995 | Inoue ........................... | 340/995 |
| 5,424,951 A | * | 6/1995 | Nobe et al. .................. | 340/995 |
| 5,463,553 A | * | 10/1995 | Araki et al. ................. | 340/990 |
| 5,486,822 A | * | 1/1996 | Tenmoku et al. ............ | 340/995 |
| 5,587,911 A | * | 12/1996 | Asano et al. ................. | 340/995 |
| 5,802,492 A | * | 9/1998 | Delorme et al. ............. | 340/995 |
| 5,808,565 A | * | 9/1998 | Matta et al. ................. | 340/988 |

FOREIGN PATENT DOCUMENTS

| | | | | |
|---|---|---|---|---|
| JP | 63-148115 | 6/1988 | ........... | G01C/21/00 |
| JP | 05313572 | 11/1993 | ........... | G09B/29/10 |
| JP | 07134798 | 5/1995 | ......... | G08G/1/0969 |
| JP | 07190789 | 7/1995 | ........... | G01C/21/00 |
| JP | 08043115 | 2/1996 | ........... | G01C/21/00 |

* cited by examiner

*Primary Examiner*—John Tweel
(74) *Attorney, Agent, or Firm*—Pennie & Edmonds LLP

(57) ABSTRACT

There is provided an in-vehicle mount type navigation device in which a user can freely set a desired destination or via-places through which a route extending to the destination passes. A memory is provided with a destination/via-place table for storing data representing the destination and the via-places through which the route extending to the destination passes. A destination/registration place setting unit in a microprocessor stores data representing a place to be added in association with any specified one of a position between a via-place and another via-place or destination, and a position next to the destination into the destination/via-place table. On the basis of the data stored in the destination/via-place table, the guide route calculator of the microprocessor calculates a guide route which successively passes through the via-places and extends to the destination.

4 Claims, 17 Drawing Sheets

| NUMBER | PLACE NAME | COORDINATE |
|---|---|---|
| 1 | ＊＊＊＊ | $(x_1, y_1)$ |
| 2 | ×××× | $(x_2, y_2)$ |
| 3 | △△△△ | $(x_3, y_3)$ |
| ⋮ | ⋮ | ⋮ |

AUTOMOTIVE NAVIGATION SYSTEM

TECHNICAL FIELD OF THE INVENTION

The present invention relates to an in-vehicle mount type navigation device which is mounted in a vehicle and displays both of a road along which the vehicle runs and its periphery, and more particularly to an in-vehicle mount type navigation device through which one obtains a guide route for guiding the vehicle to a destination.

BACKGROUND OF THE INVENTION

There has been hitherto known an in-vehicle mount type navigation device which calculates the current position of a vehicle running on a road to display the current position on a screen of a liquid crystal display device or the like and also displays a guide route along which the vehicle should run to a destination. In this system, the current position of the vehicle is calculated on the basis of both of the travel direction of the vehicle measured by an azimuth sensor such as gyro or the like and the travel distance of the vehicle measured by a vehicle speed sensor or distance sensor. The travel distance of the vehicle is generally calculated by measuring the revolutions per predetermined travel interval of the output shaft of a transmission or the like and multiplying the revolutions per predetermined travel interval thus measured by a distance coefficient corresponding to the travel distance of the vehicle per one revolution of a tire.

Further, Japanese Laid-open Patent Application Sho-63-148115 has disclosed a technique of correcting an error of the current position calculated on the basis of the travel direction and travel distance of the vehicle thus obtained. According to this technique, an estimation position of a vehicle is calculated on the basis of the travel distance and the azimuth (direction) variation amount of the vehicle, and an error amount is gained on the basis of the error of a road map. Thereafter, in association with each of all the roads located within the range of the error amount with the estimation position of the vehicle at the center thereof, positions on each of the roads are registered as self-positions. The correlative coefficients of these self-positions thus registered to each road are calculated, and the self-position associated with the correlative coefficient which shows the minimum error to the roads is set as the current position of the vehicle. An image obtained by superposing a mark indicating the current position thus obtained (for example, an arrow) and a map corresponding to map data stored in a CD-ROM is displayed on the screen of the liquid crystal display device.

As described above, the in-vehicle mount type navigation device is provided with a function of setting a destination, determine a route extending from the current position to the destination by using Dijkstra's Algorithm or the like and guiding the vehicle along the route thus determined. Recently, there has been proposed an in-vehicle mount type navigation device in which not only a final destination, but also one or two places through which a route extending to the destination passes (hereinafter referred to as "via-place") can be set to determine a guide route passing through the via-place(s) to the destination.

SUMMARY OF THE INVENTION

However, the conventional navigation device has a problem that once a predetermined number of (one or two) via-places and destinations are set, the alteration thereof is difficult. That is, although it is possible to change a place set as a via-place to another place and change a place as a destination to another place, it is difficult to alter the destination to a via-place or add a new via-place.

Further, there is also a problem that a cumbersome operation must be carried out to set the destination for searching a route.

Therefore, a first object of the present invention is to provide an in-vehicle mount type navigation device with which a user can freely set a destination and via-places through which a route extending to the destination passes.

A second object of the present invention is to provide an in-vehicle mount type navigation device which can search a route to a desired destination without needing any cumbersome operation.

In order to attain the first object of the present invention, an in-vehicle mount type navigation device including map data read-out means for reading out map data from a road data storing medium in which data on a map containing roads and names of respective places are stored, current position calculating means for calculating a current position of a vehicle, display means for displaying the map and the current position of the vehicle, and guide route calculating means for calculating a guide route to the settled destination by referring to the map data, further including:

destination/via-place storing means for storing data representing the destination and via-places through which the route to the destination passes;

position specifying means for specifying any position between a via-place and another via-place or between a via-place and a destination, or any position next to the destination;

place specifying means for specifying a place to be added to the position specified by the position specifying means; and destination/via-place control means for storing the data representing the place specified by the place specifying means into the destination/via-place storing means in association with the position specified by the position specifying means, wherein on the basis of the data stored in the destination/via-place storing means, the guide route calculating means calculates a guide route which successively passes through the via-places and finally reaches the destination.

According to the present invention, the data on a place to be newly added to a position specified by the position specifying means is written as a via-place or destination into the destination/via-place storing means, thereby obtaining a guide route which passes through or reaches the via-place or the destination thus newly added.

Accordingly, a driver can freely set the via-place and the destination to be guided along the guide route.

In the present invention, an image containing a list in which the via-places and/or the destination are described in passage order and a list in which the position between the via-places or between the destination and the via-place or the position next to the destination are specified may be generated on the basis of the data stored in the destination/via-place storing means by the position specifying means, and the image may be displayed by the display means.

Further, the data representing the points of the via-places and/or the destination may be stored into the destination/via-place storing means by the destination/via-place control means while these points are associated with the passage order thereof, and the point which is associated with the largest number of the passage order is settled as the destination.

In response to an instruction indicating as the destination the center position of a map displayed on the display means, the data representing the center position may be stored as data representing the destination into the destination/via-place storing means by the destination/via-place control means, and the data which are previously stored as the destination may be set as a via-place located just before the destination.

Through the above operation, a new destination can be added without performing any operation of searching the name of a place or the like.

In order to attain the above second object of the present invention, an in-vehicle mount type navigation device including map data read-out means for reading out map data from a road data storing medium in which data on a map containing roads and names of respective places are stored, current position calculating means for calculating a current position of a vehicle, display means for displaying the map and the current position of the vehicle, and guide route calculating means for calculating a guide route to the settled destination by referring to the map data, further including: registration place specifying means for specifying some of registration places corresponding to points which are beforehand registered, wherein the guide route calculation means sets the registration place thus specified as a destination to calculate a guide route extending to the destination.

BEST MODES OF THE INVENTION

Preferred embodiments according to the present invention will be described in detail with reference to the accompanying drawings.

Figure 1:
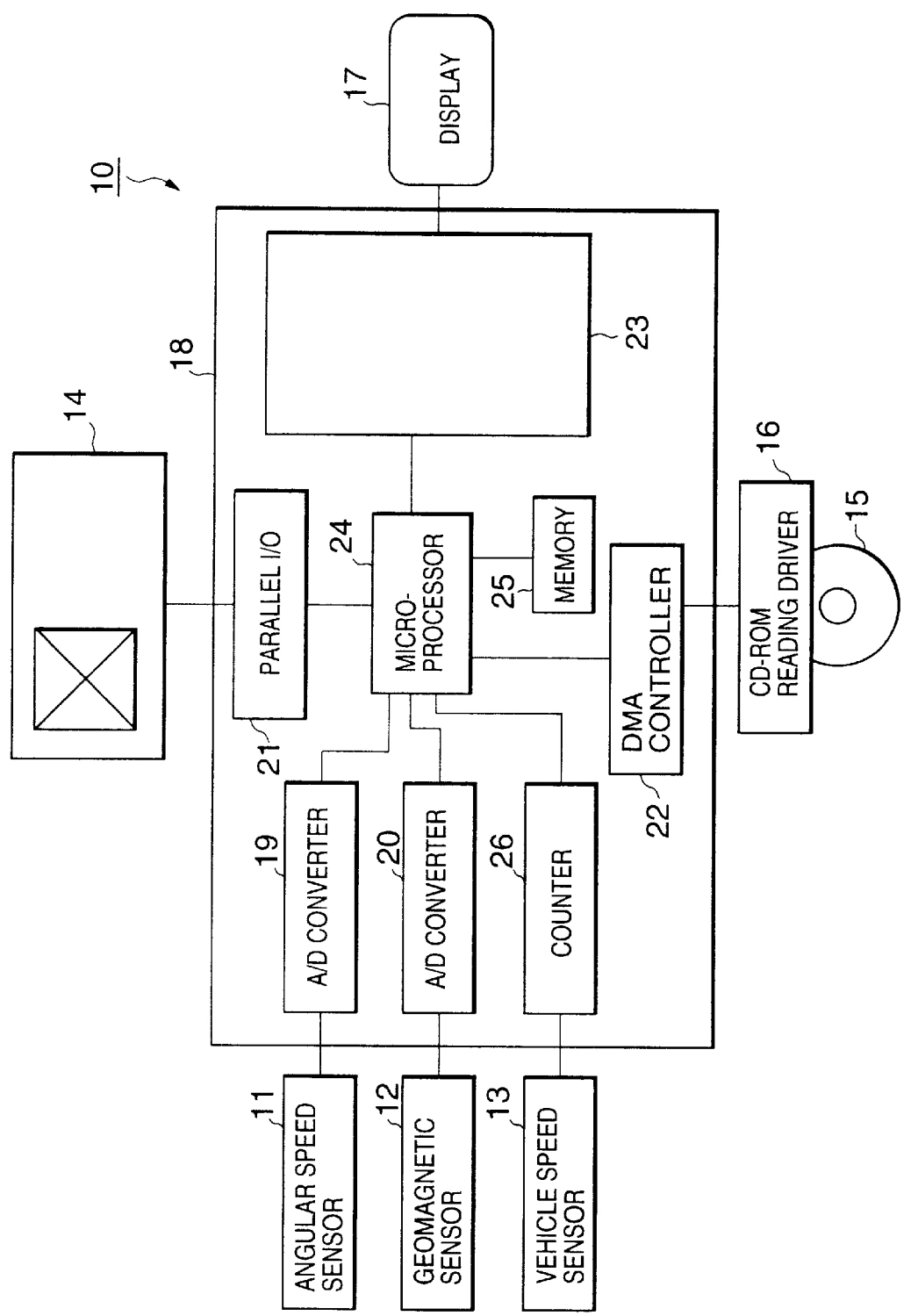
FIG. 1 is a block diagram showing the configuration of an in-vehicle mount type navigation device according to an embodiment of the present invention.

FIG. 1 is a block diagram showing the configuration of an in-vehicle mount type navigation device according to an embodiment according to the present invention.

As shown in FIG. 1, the in-vehicle mount type navigation device 10 includes an angular speed sensor 11 for detecting variation of the travel direction of a vehicle by detecting the yaw rate of the vehicle, an azimuth sensor 12 for detecting the travel direction of the vehicle by detecting geomagnetism, and a vehicle speed sensor 13 for outputting pulses at a time interval which is proportional to the revolutionsn of the output shaft of the transmission of the vehicle.

Further, the in-vehicle mount type navigation device 10 further includes a display 17 for displaying a map of the periphery of the current position, a mark indicating the current position, etc., a switch 14 which receives information to be displayed on the display 17 and an instruction of switching the screen or the like from a user (driver), a CD-ROM 15 in which digital map data are beforehand stored, a driver 16 for reading out the map data from the CD-ROM 15, and a controller 18 for controlling the operation of each peripheral device as described above. In this embodiment, the digital map data stored in the CD-ROM 15 contains road data composed of coordinates representing the end portions of plural line segments, road width data representing the road width of the roads, facilities data such as the names, positions (coordinates), etc. of stores such as restaurants, convenience stores, gasoline service stations, etc. and public facilities.

The switch 14 comprises a key switch and a joy stick mounted on the main body of the in-vehicle mount type navigation device and a touch panel provided to the front face of the display 17.

The controller 18 has an A/D converter 19 for converting a signal (analog signal) of the angular speed sensor 11 to a digital signal, an A/D converter 20 for converting a signal (analog signal) of the azimuth sensor 12 to a digital signal, a counter 26 for counting the number of pulses output from the vehicle speed sensor 13 every 0.1 second, a parallel I/O 21 which receives presence or absence of press of the switch 14, a DMA (Direct Memory Access) controller 22 for transferring the map data read out from the CD-ROM 15, a display processor 23 for displaying a map image on the display 17, a microprocessor 24 and a memory 25.

The display processor 23 generates pixel-based data on the basis of the map data and the current position of the vehicle, adds the data thus generated with predetermined R, G and B signals and outputs the signals thus obtained to the display 17.

The microprocessor 24 operates on the basis of a program stored in the memory 25 to execute necessary processing.

Figure 2:
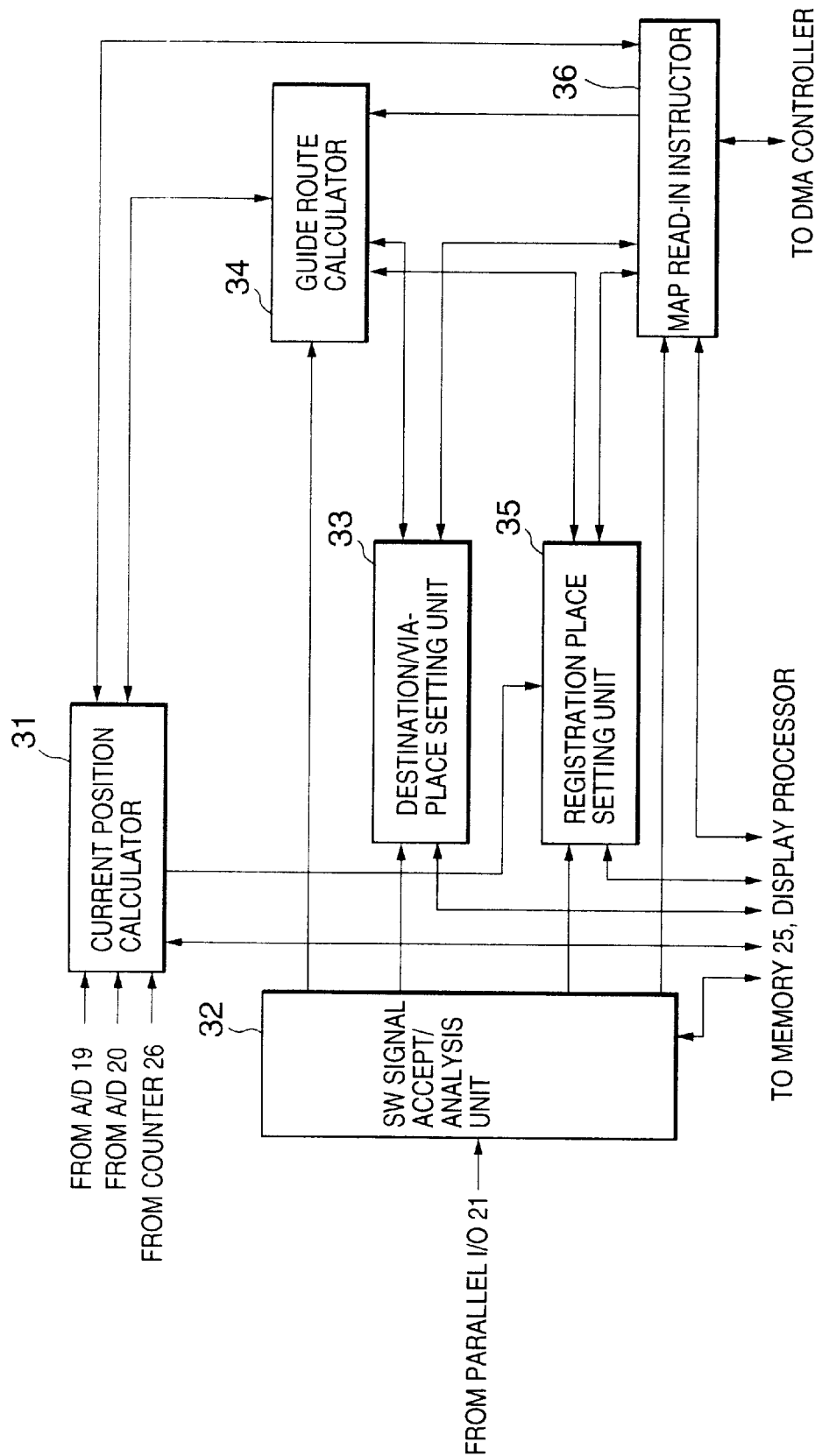
FIG. 2 is a block diagram showing the configuration of a microprocessor according to the embodiment of the present invention.

FIG. 2 is a block diagram showing the configuration of the microprocessor 24 according to the embodiment of the present invention. As shown in FIG. 2, the microprocessor 24 includes a current position calculator 31 for receiving the signals from the angular sensor 11, the geomagnetic sensor 12 and the vehicle speed sensor 13 and calculating the current position of the vehicle on the basis of these signals, a switch signal accept/analysis unit 32 which is connected to the switch 14 and analyzes an instruction from the switch 14 to start each of parts described later, a destination/via-place setting unit 33 for setting a destination which is the final place at which the vehicle is going to arrive, and via-places through which the route to the destination passes, a guide route calculator 34 for calculating a guide route which starts from a predetermined position, passes through the via-places and reaches the destination, a registration place setting unit 35 for setting a registration place as described later, and a map read-in instructor 36 which is connected through the DMA controller 22 to the CD-ROM read-in driver 16 to supply an instruction of reading required map data to the CD-ROM read-in driver 16, and accepts the map data from the CD-ROM read-in driver 16.

The current position calculator 31 calculates the current position of the vehicle on the basis of the signal of the angular speed sensor 11 obtained through the A/D converter 19, the signal of the azimuth sensor 12 obtained through the A/D converter 20, the output pulse number of the vehicle sensor 13 which is counted by the counter 26, and the map data from the CD-ROM 15 which is obtained through the DMA controller 22. The data representing the current position of the vehicle obtained by the current position calculator 31 is supplied to the display processor 23, and the position of the vehicle which is superposed on the map based on the map data is displayed on the screen of the display 17.

The switch signal accept/analysis unit 32 judges through the parallel I/O 21 whether the switch 14 is pushed or not and which switch is pushed, and then it informs the judgment result to each part and instructs execution of necessary processing.

The memory 25 (FIG. 1) contains ROM in which a program defining the processing of the microprocessor, and the like are stored, and RAM serving as a work area when the processing is carried out by the microprocessor.

Figure 3:
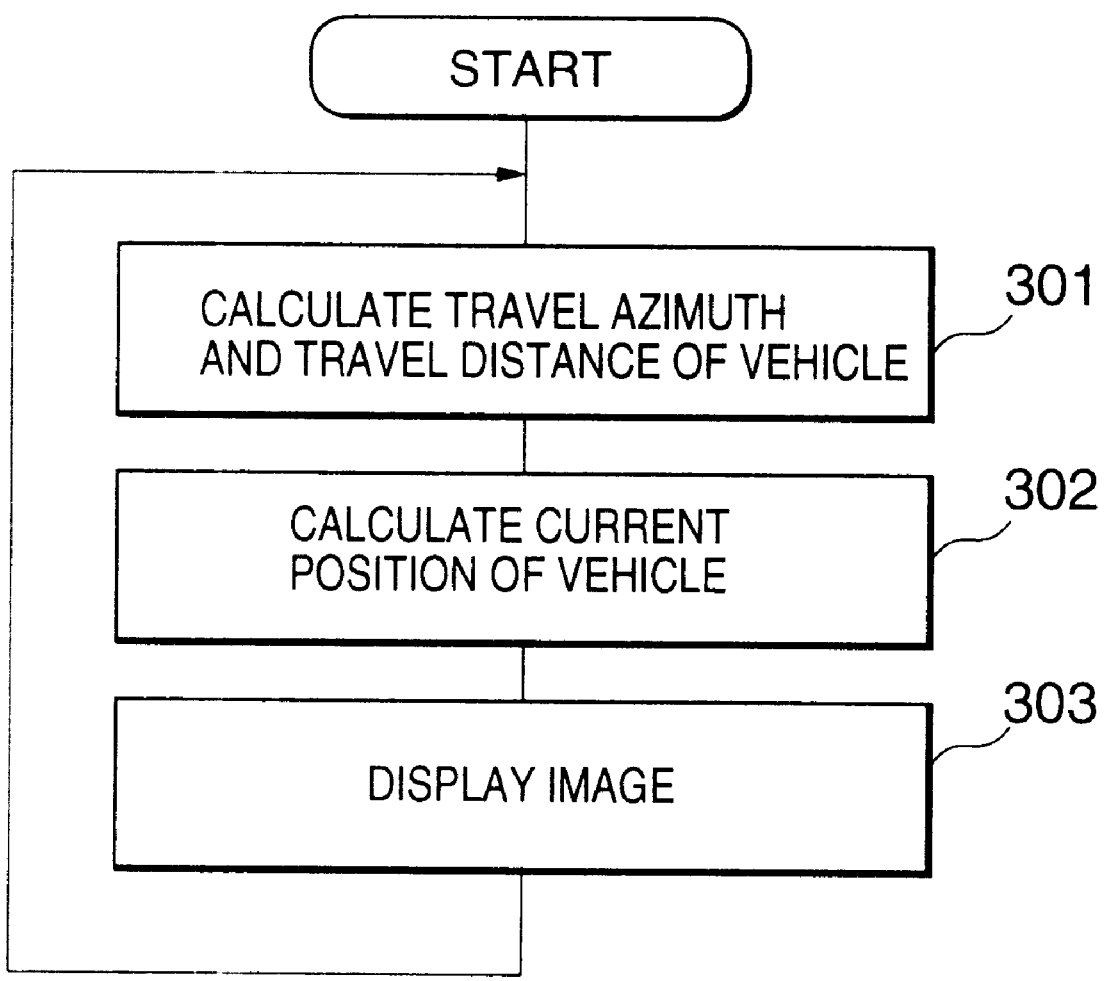
FIG. 3 is a flowchart schematically showing the processing executed by the in-vehicle mount type navigation according to the embodiment of the present invention.

The operation of the in-vehicle mount type navigation device thus constructed will be described hereunder. FIG. 3 is a flowchart schematically showing the processing executed by the in-vehicle mount type navigation device 10 according to this embodiment. As shown in FIG. 3, the processing is mainly divided into three steps: a first step (step 301) of calculating the travel azimuth and travel distance of a vehicle; a second step (step 302) of determining the current position of the vehicle on the basis of the travel azimuth and the travel distance thus calculated; and a third step (step 303) of displaying the position and azimuth of the vehicle thus obtained together with shops located around the vehicle, etc. on the screen of the display 17 while they are superposed on a map, or displaying a needed image on the screen of the display 17 in accordance with press of the switch.

First, the first step (step 301) of calculating the travel azimuth and travel distance of the vehicle and the second step (step 302) of determining the current position of the vehicle on the basis of the travel azimuth and the travel distance thus calculated will be described.

In step 301, the following processing is executed every fixed period, for example, every 100 ms. First, the output value of the angular speed sensor 11 is read in through the A/D converter 19. The variation of the azimuth is output as the output value of the angular speed sensor 11, and thus only a relative value of the travel direction of the vehicle can be detected. Therefore, subsequently, the output value of the azimuth sensor 12 composed of a geomagnetic sensor is read in, and then an estimated azimuth of the vehicle is determined on the basis of the absolute azimuth calculated from the output value of the azimuth sensor 12 and the azimuth variation (angular speed output) output from the angular speed sensor 11. When the vehicle speed is low for a long time, the error of the angular speed sensor is increased. Therefore, when the vehicle speed is low for a fixed time or more, the determination of the azimuth is carried out by using only the azimuth of the azimuth sensor. Subsequently, the number of pulses output from the vehicle speed sensor 13 is counted by the counter 26 every 0.1 second, and the count value thus obtained is read in. The read-in value is multiplied by a distance coefficient to calculate a distance by which the vehicle travels in a predetermined period.

Subsequently, the travel distance value per predetermined period thus determined is integrated into the previously-obtained distance value, and it is checked whether the travel distance of the vehicle reaches a predetermined distance. If the travel distance does not reach the predetermined distance, the processing is finished and new processing is started. On the other hand, if the travel distance of the vehicle reaches the predetermined distance, the travel direction and the travel distance R are output just at that time, and the integrated distance is initialized to newly start the integration of the travel distance.

Figure 4:
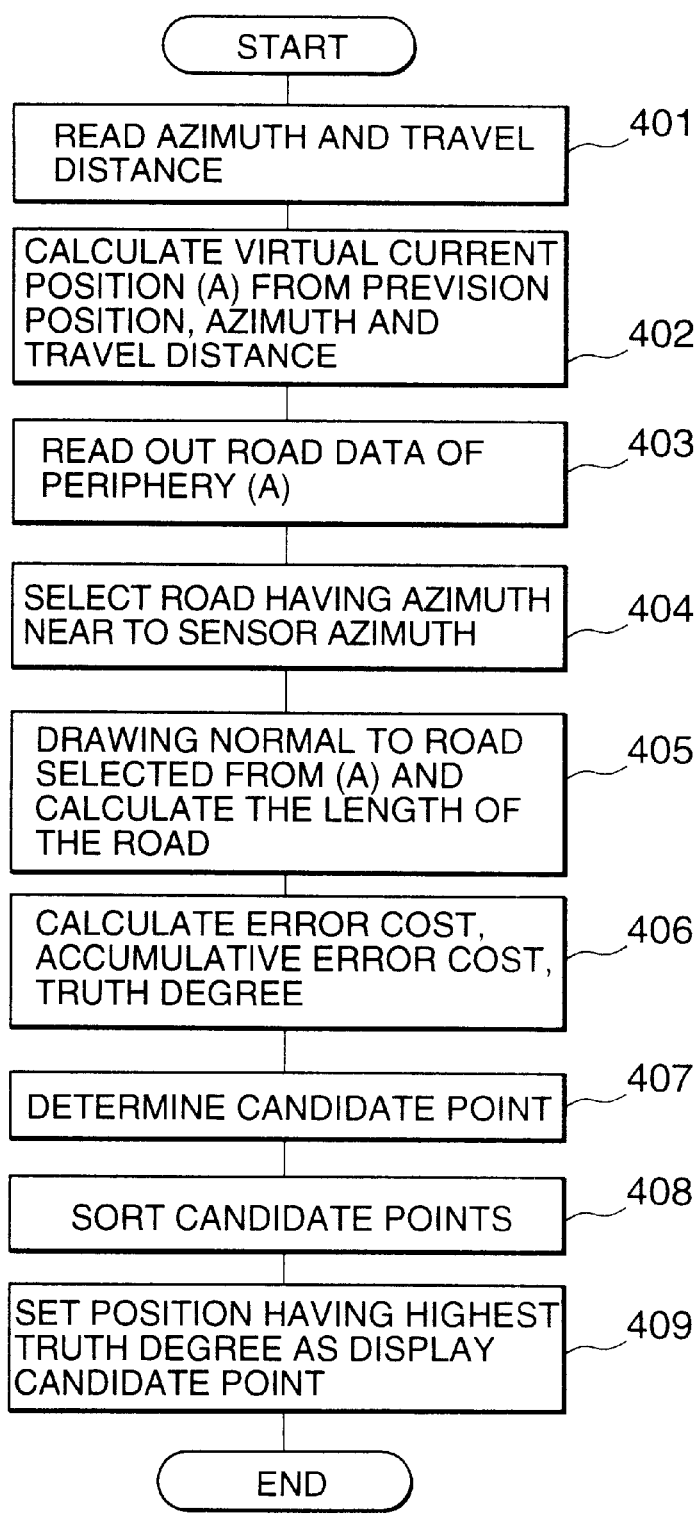
FIG. 4 is a flowchart showing the processing of calculating the current position of a vehicle according to the embodiment of the present invention.

Next, the processing of calculating a virtual current position of the vehicle is calculated on the basis of the travel azimuth and travel distance of the vehicle obtained in step 301 and determining a candidate point serving as a candidate of the current position of the vehicle on the basis of the virtual current position thus calculated will be described with reference to the flowchart of FIG. 4.

The processing of the step 302 is executed when the vehicle travels by a predetermined distance and the travel azimuth and travel distance of the vehicle are obtained in step 301. In this processing, the travel azimuth and the travel distance obtained in step 301 are first read in (step 401), and the movement amount of the vehicle is calculated individually in each of the latitude and longitude directions. Further, the movement amount in each direction is added to the position of the candidate point of the vehicle which was determined in the previous processing of determining the candidate point of the vehicle, and a virtual current position (A) corresponding to a position at which the vehicle is estimated to exist at present (step 402). If any candidate point obtained in the previous processing of determining the candidate point of the vehicle does not exist, for example, just after the device is started, a position which is set in another manner is used as the position of the previously-obtained candidate point to determine the virtual current position (A).

Figure 5:
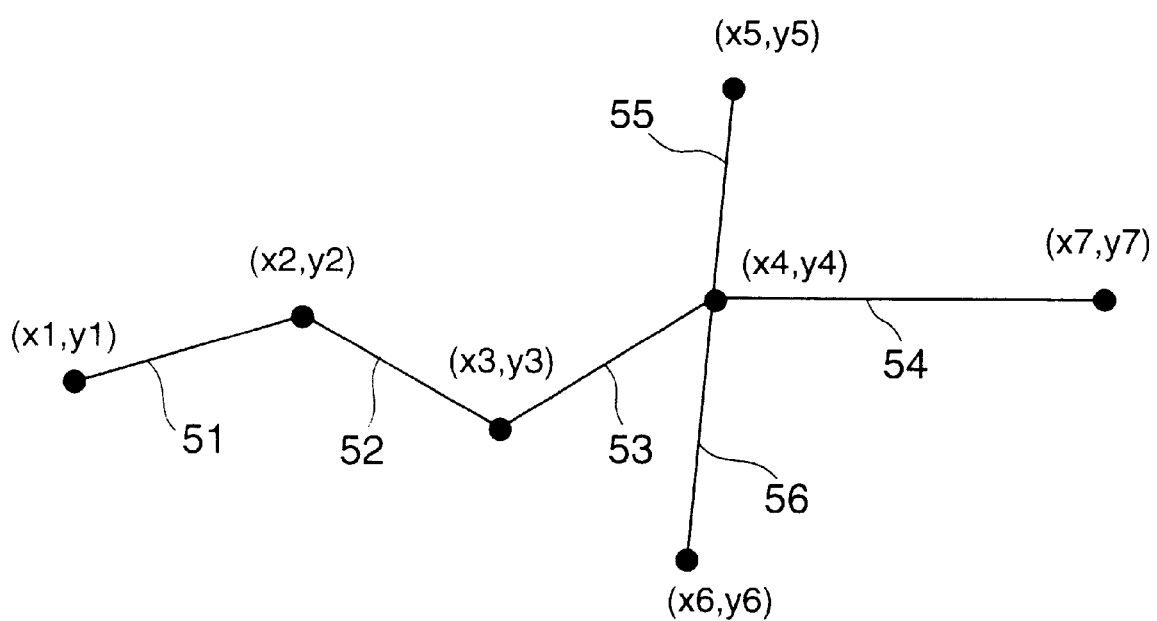
FIG. 5 is a diagram explaining map data according to the embodiment of the present invention.

Subsequently, a map of the periphery of the virtual current position (A) is read out from the CD-ROM 15 through the driver 16 and the DMA controller 22, and road data (line segments) within a predetermined distance D with the virtual current position (A) at the center are selected and picked up (step 403). In this embodiment, a map contained in an area corresponding to a square having a length of L1 which contains the virtual current position (A) at the center thereof is read out from the CD-ROM 15. As described above, in this embodiment, roads may be approximated by a plurality of line segments 51 to 56 each connecting two points, and each line segment are represented by the coordinates of a start point and an end point of the line segment as shown in FIG. 5. These data are used as the road data as described above. For example, a line segment 53 is represented by a start point (x3, y3) and an end point (x4, y4).

Subsequently, only line segments are selected from all the line segments picked up in step 403 under the condition that the difference between the azimuth thereof and the travel direction calculated is within a predetermined value (step 404). Thereafter, the normal to each of all the selected line segments of n is drawn from the virtual current position (A), and the length of the normal L(n) is calculated (step 405). Subsequently, an error cost value ec (n) defined by the following equation is calculated on the basis of the length of the normal for all the line segments selected in the step 404.

$$ec(n) = \alpha|\theta car - \theta(n)| + \beta|L(n)|$$

Here, θcar represents the azimuth of the vehicle at the virtual current position (A), θ(n) represents the azimuth of the line segments (n), L(n) represents the distance from the virtual current position (A) to the line segments, that is, the length of the normal, and α and β represent weight coefficients. These weight coefficient values may be varied in accordance with which one of the directional displacement between the travel direction and the azimuth of the road and the positional displacement between the current position and the road should be more weighted to select a road on which the current position is located.

Figure 6:
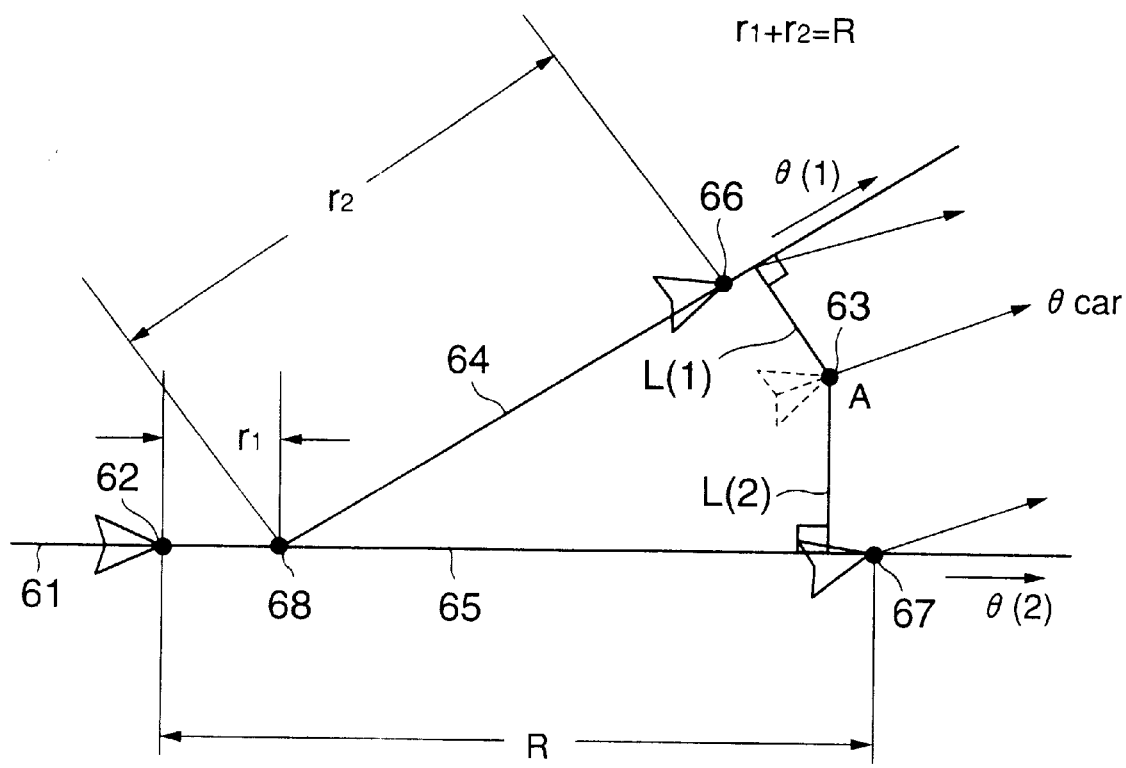
FIG. 6 is a diagram explaining a line segment corresponding to a road, a virtual current position and a candidate point.

Here, the candidate point will be described. In an initial state, for example, just after the device is started, the virtual current position (A) is uniquely settled by inputting predetermined information through the switch 14 by a user (driver), and this position exists on a line segment corresponding to a road. However, after the vehicle runs, there may be a case where the virtual current position (A) does not exist on the line segment corresponding to the road due to an error of the azimuth sensor such as a gyro or the like. As a result, for example when a road is branched as shown in FIG. 6, that is, when two line segments 64 and 65 appear from a node 68 of the line segment 61 corresponding to a road, it frequently occurs a case where the road corresponding to the line segment on which the vehicle exists cannot be specified. Accordingly, in such a case, possible prescribed points which exist on two line segments are set as candidate points, and the current positions, the error costs and the accumulative error costs of these candidate points, etc. are stored in a predetermined area of RAM of the memory 25. In order to simplify the description, in the following description, it is assumed that one or more new candidate points are generated from a single candidate point unless it is particularly described that one or more new candidate points are generated from plural candidate points.

Subsequently, the accumulative error cost es(n) in this processing which is defined by the following equation is calculated according to the calculated error cost ec(n) and the accumulative error cost es associated with the candidate point calculated in the previous processing (step 406).

$$es(n) = (1-k) \times es + k \times ec(n)$$

Here, k represents a weight coefficient which is larger than zero and smaller than 1. The accumulative error cost es(n) represents how much degree the error cost calculated in the just previous processing and further previous processing is reflected to the error cost calculated in the current processing. Further, the trust degree trst(n) defined by the following equation is calculated on the basis of the accumulative error cost es(n) thus calculated (step 406).

$$trst(n) = 100/(1 + es(n))$$

As is apparent from the above equation, as the accumulative error cost ec(n) is increased, the trust degree trst(n) is reduced and approaches to zero. On the other hand, as the accumulative error cost ec(n) is reduced, the trust degree trst(n) is increased and approaches to 100.

By performing the above processing, the trust degree trst(n) associated with the line segments of n which exist within a predetermined range D with the current position A for a candidate point at the center is calculated. When a plurality of candidate points exist, the trust degree trst (m,n) associated with the line segments of n existing in a predetermined range D from the respective candidate points Cm may be calculated.

Subsequently, on the basis of the trust degree trst(n) thus calculated, a point which is advanced from a candidate point along the corresponding line segment by the length corresponding to the distance R by which the vehicle travels is set as a new candidate point C(n) (step 407). Accordingly, if there are line segments of n which are located within a predetermined range D with the current position A for some candidate point at the center, the difference between the azimuth of the line segments and the azimuth of the vehicle being below a predetermined value, new candidate points C(n) of n are generated.

Further, according to the value of the trust degree trst(n) for each of the new candidate points C(n), these new candidate points C(n) are sorted (step 408), a candidate point C(i) having the largest trust degree is set as a display candidate point CD, that is, a candidate point to be displayed on the display 17 and the position, the accumulative error cost, and the trust degree of the candidate point concerned are stored in the predetermined area of RAM of the memory 25. In addition, the position, the accumulative error cost and the trust degree of the candidate points other than the display candidate point are also stored in the predetermined area of RAM (step 409).

For example, it is assumed that the current position A is displayed at the position indicated by a point 63 for a candidate point 62 existing on the line segment 61 as shown in FIG. 6. In such a case, line segments 64 and 65 which are located within a predetermined range D with the current position A at the center and for which the difference between the azimuth thereof and the azimuth of the vehicle is equal to or smaller than a predetermined value, are picked up to calculate the distance L(1) between the current position A and the line segment 64 and the distance L(2) between the current position A and the line segment 65, and also the associated error cost, accumulative cost and trust degree are calculated on the basis of the calculated distances, the angles θ(1), θ(2) of the line segments 64, 65 and the vehicle azimuth θcar. Further, a position which is advanced from some candidate point 62 along the line segments 61 and 64 or along the line segments 61 and 65 by the length corresponding to the travel distance R is determined on the basis of the travel distance R of the vehicle calculated in step 405 of FIG. 3, and the points corresponding to the positions thus determined are set as candidate points 66, 67. One candidate point having the largest trust degree trst in the candidate points 66, 67 thus determined is set as a display candidate point. After the display candidate point is obtained, an image in which an arrow is superposed on the map corresponding to the map data is displayed on the screen of the display 17 (step 330 of FIG. 3).

Figure 7:
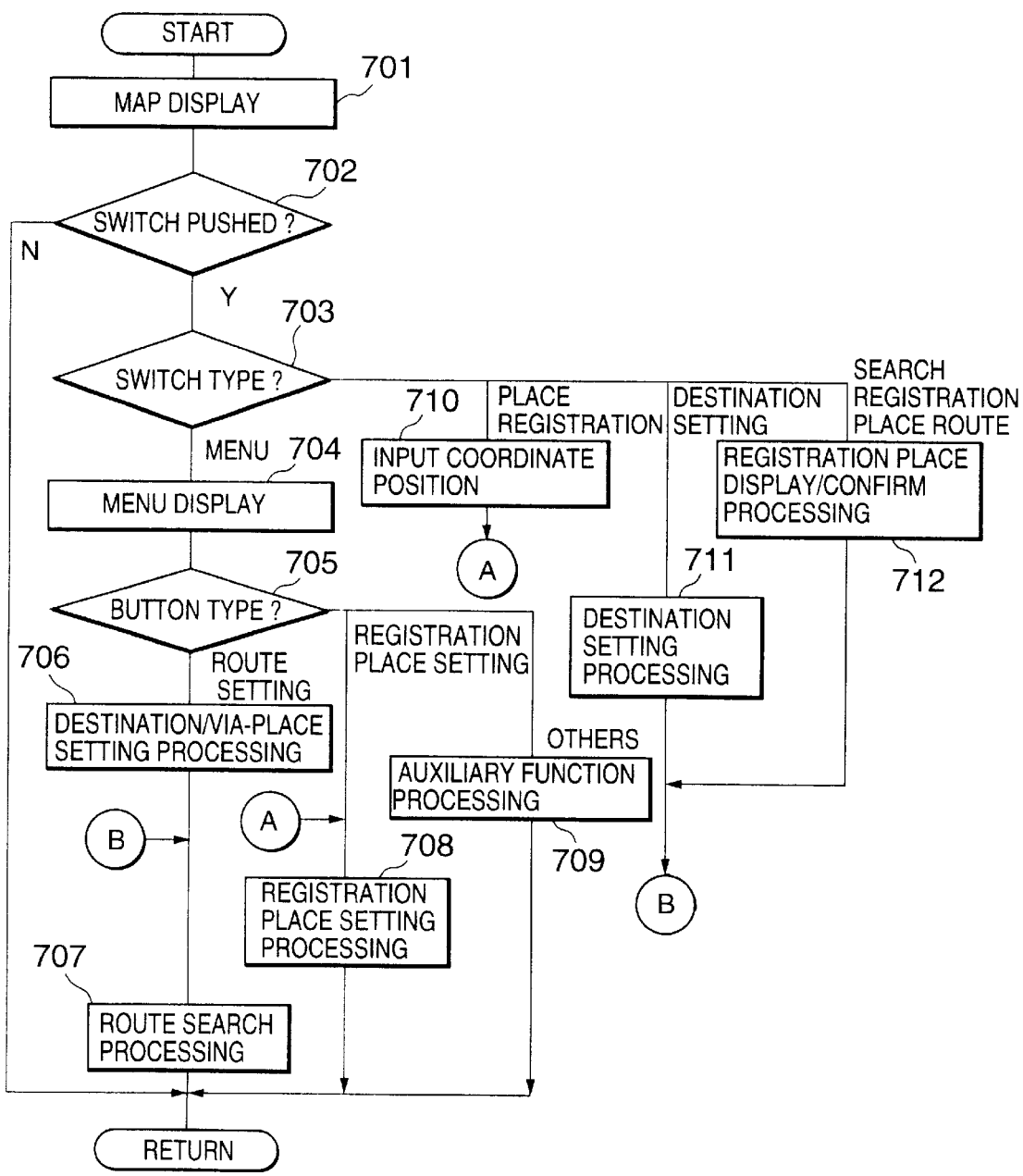
FIG. 7 is a flowchart showing the processing of displaying an image on the screen of a display of the in-vehicle mount type navigation device according to the embodiment of the present invention.

Next, the processing of the step 303 will be described in detail. FIG. 7 is a flowchart showing the processing of displaying an image on the screen of the display of the in-vehicle mount type navigation device according to the embodiment of the present invention. In this embodiment, by operating the predetermined switch 14 (see FIG. 1), various images can be displayed on the screen of the display 17.

Figure 8:
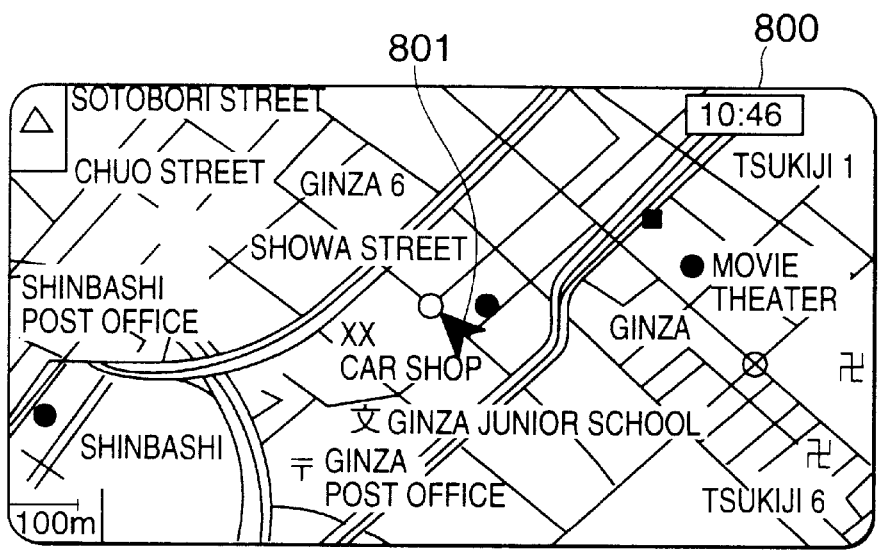
FIG. 8 is a diagram showing an example of the image displayed on the screen of the display according to the embodiment of the present invention.

First, in accordance with an instruction of the map read-in instructor 36, the map data corresponding to a map located within a predetermined range while the current position of the vehicle (display candidate point) obtained in the step 302 of FIG. 3 is set at the center of the range are read out from the CD-ROM 15 by the CD-ROM driver 16, and the map data thus read out are supplied to the map read-in instructor 36. The data on the current position obtained by the current position calculator 31 and the map data supplied to the map read-in instructor 36 are supplied to the display processor 23, and an image containing a map on which an arrow indicating the current position of the vehicle is superposed and buttons, if necessary, is displayed on the screen of the display 17 (step 701). FIG. 8 shows an example of the image thus obtained.

As shown in FIG. 8, the names of prescribed places and an arrow 801 indicating the current position of the vehicle are displayed on the screen 800 while superposed on a map having roads drawn thereon. As occasion demands, buttons which also serve as switches may be displayed with being superposed on the map although they are omitted from the illustration of FIG. 8.

Subsequently, it is judged by the switch signal accept/analysis unit 32 whether some switch 14 is pushed or not (step 702). If the judgment of the step 702 is YES (Y), the processing goes to step 703. On the other hand, if the judgment of the step 702 is NO (N), the processing is finished.

In step 703, the switch signal accept/analysis unit 32 identifies the type of the pushed switch (button). If the pushed switch is a "menu" switch, the menu display processing is executed (step 704). If the pushed switch is a "place registering" switch, a "destination setting" switch or a "registered place route search" switch, the processing goes to step 710, 711 or 712 respectively.

Figure 9:
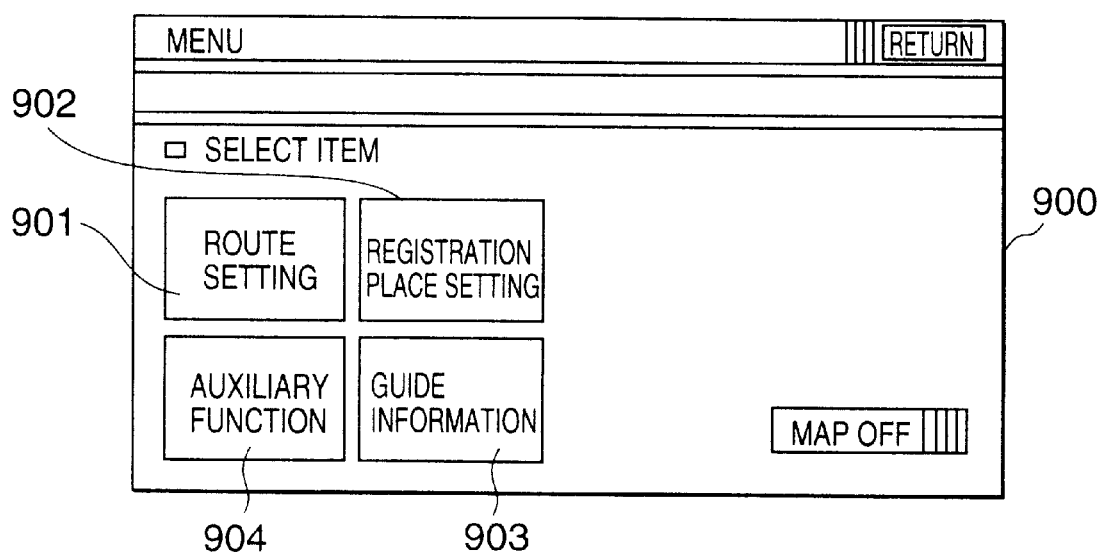
FIG. 9 is a diagram showing an example of the image displayed on the screen of the display according to the embodiment of the present invention.

In step 704, the switch signal accept/analysis unit 32 supplies the display processor 23 with an instruction of displaying a menu frame, and in response to this instruction the display processor 23 displays an image shown in FIG. 9 on the screen of the display 17. As shown in FIG. 9, a "route setting" button 901, a "registration place setting" button 902 and other function buttons (reference numeral 903, etc.) are displayed on the display frame 900. Subsequently, the switch signal accept/analysis unit 32 judges which button on the menu frame is pushed (step 705). If the "route setting" button 901 is pushed in FIG. 9, the processing goes to step 706. If the "registration place setting" button 902 is pushed, the processing goes to step 708 or if one of the other buttons is pushed, the processing goes to step 709.

Figure 10:
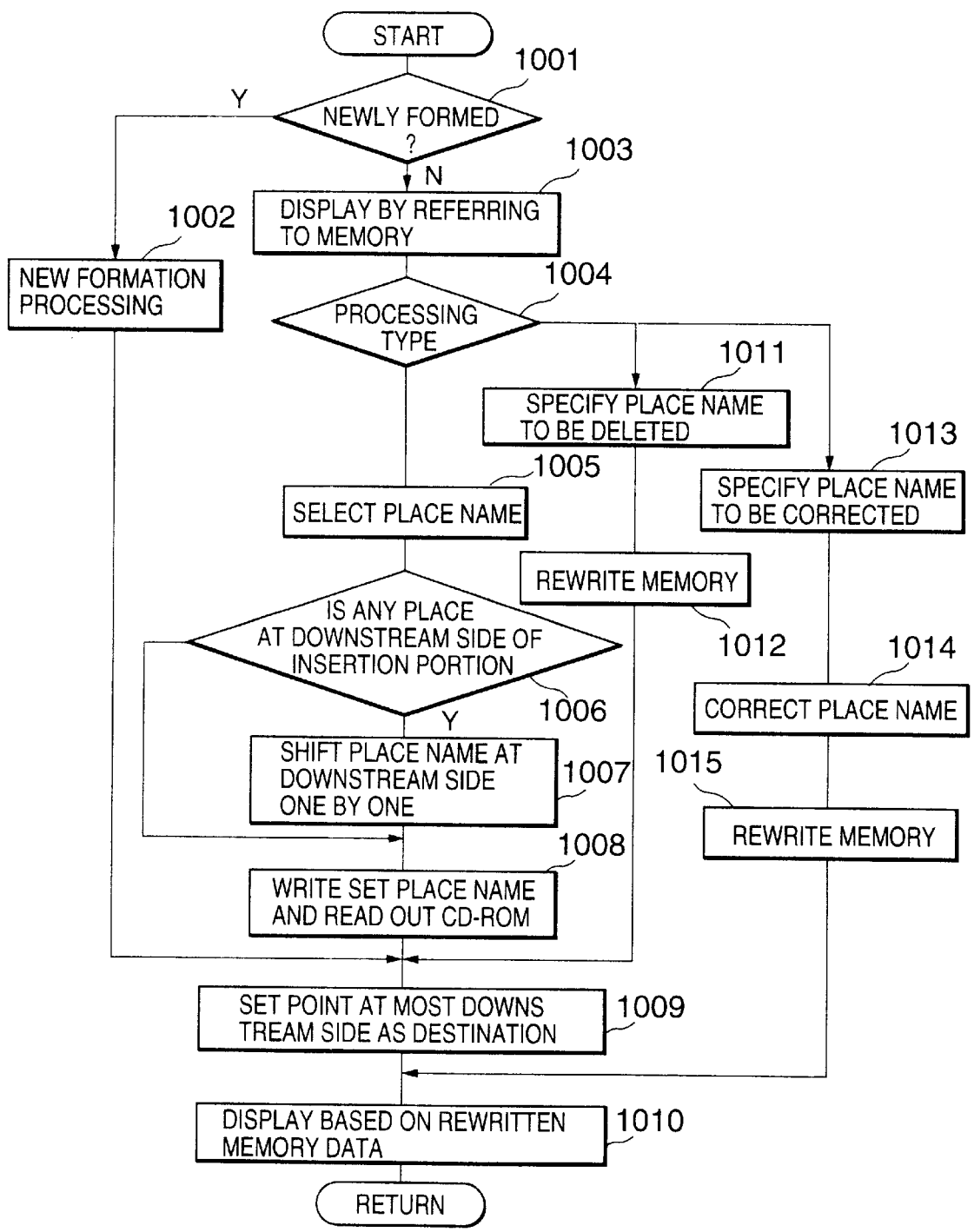
FIG. 10 is a flowchart showing destination/via-place setting processing according to the embodiment of the present invention.

Next, the processing of the step 706 will be described. FIG. 10 is a flowchart showing the destination/via-place setting processing of the step 706. In this specification, a destination means the final point of the guide route, that is, the point which is set as the place to which the vehicle is to finally reach through the guide of the navigation device, and a via-place means a point through which the guide route passes until it reaches the destination.

When the destination/via-place setting unit 33 is started by the switch signal access/analysis unit 32, the destination/via-place setting unit 33 first judges whether a destination and a via-place (via-places) should be newly set (newly formed) (step 1001). More specifically, this judgment is performed by judging whether data on the destination and/or the via-place (via-places) are stored in the predetermined area of the memory 25.

Figure 11:
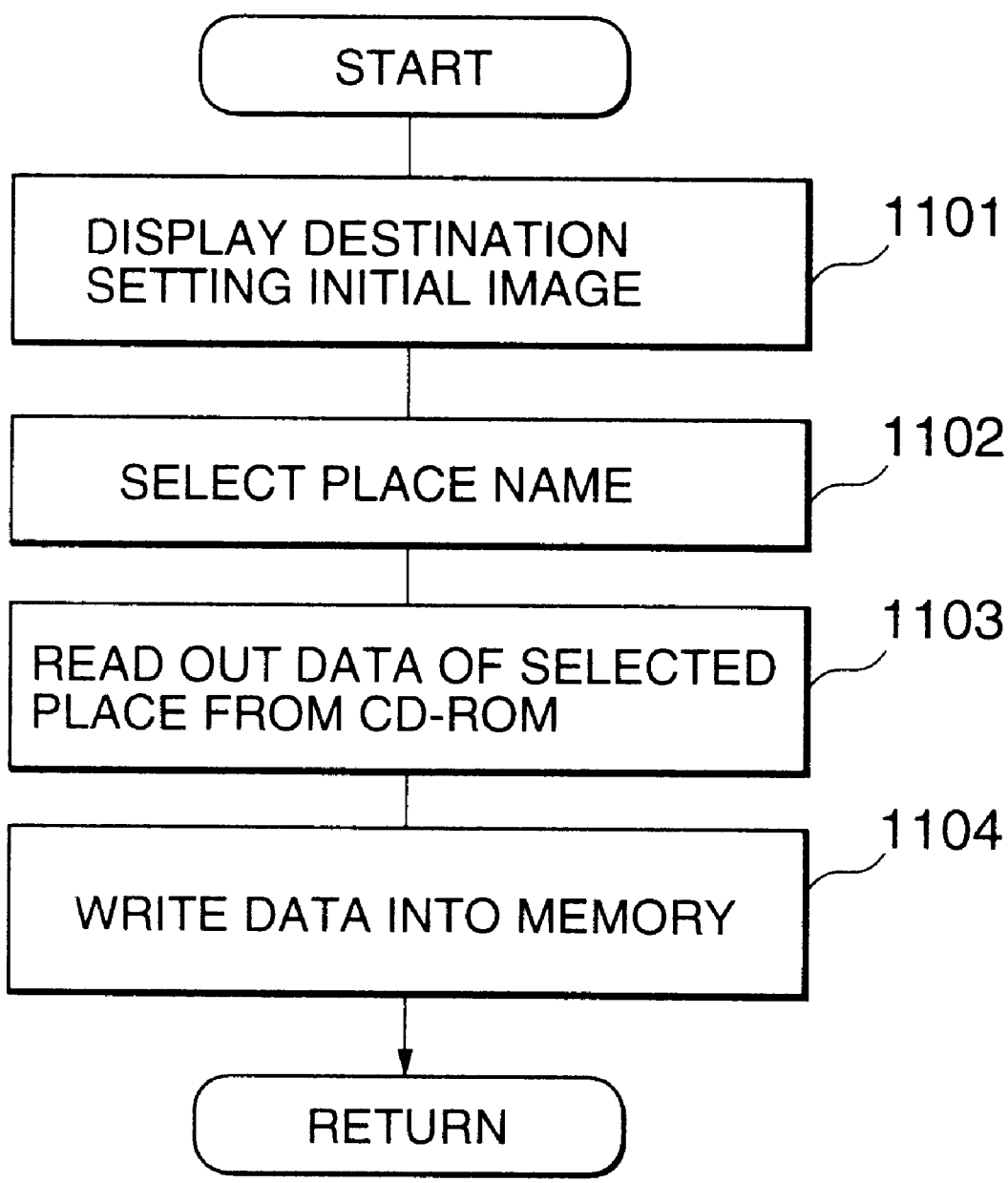
FIG. 11 is a flowchart showing new forming processing according to the embodiment of the present invention.
Figure 12:
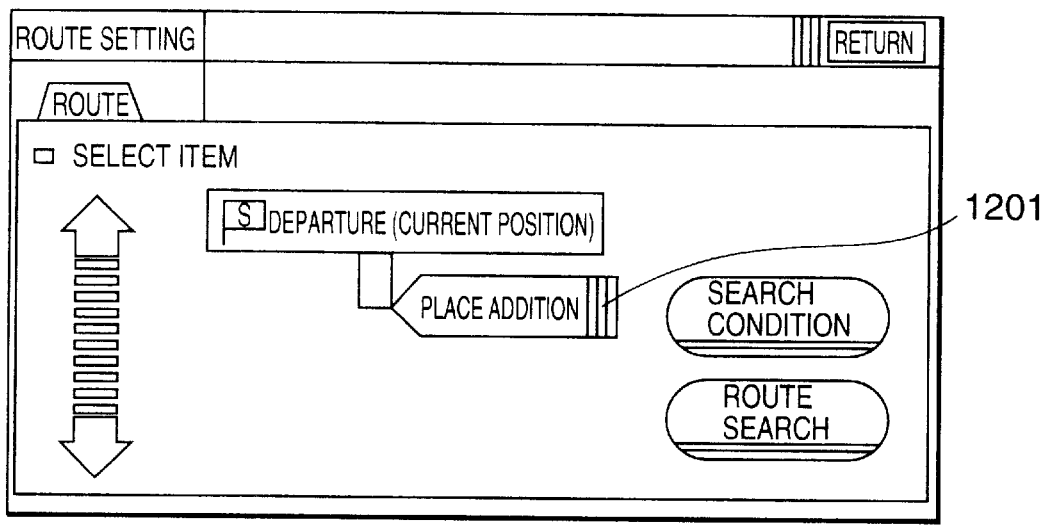
FIG. 12 is a diagram showing an example of the image displayed on the screen of the display of the embodiment of the present invention.

When the new formation is judged (YES (Y) in step 1001), the new formation processing is executed (step 1002). In the new formation processing, an initial image to set a destination shown in FIG. 12 is first displayed on the screen of the display 17 as shown in FIG. 11 (step 1101). The driver pushes the "place setting" button 1201 shown in FIG. 12 to display an image shown in FIG. 13 on the screen of the display. Subsequently, the driver successively pushes the switch (the button on the screen of the display 17) to select the name of a prescribed point (the name of a place) (step 1102).

Figure 13:
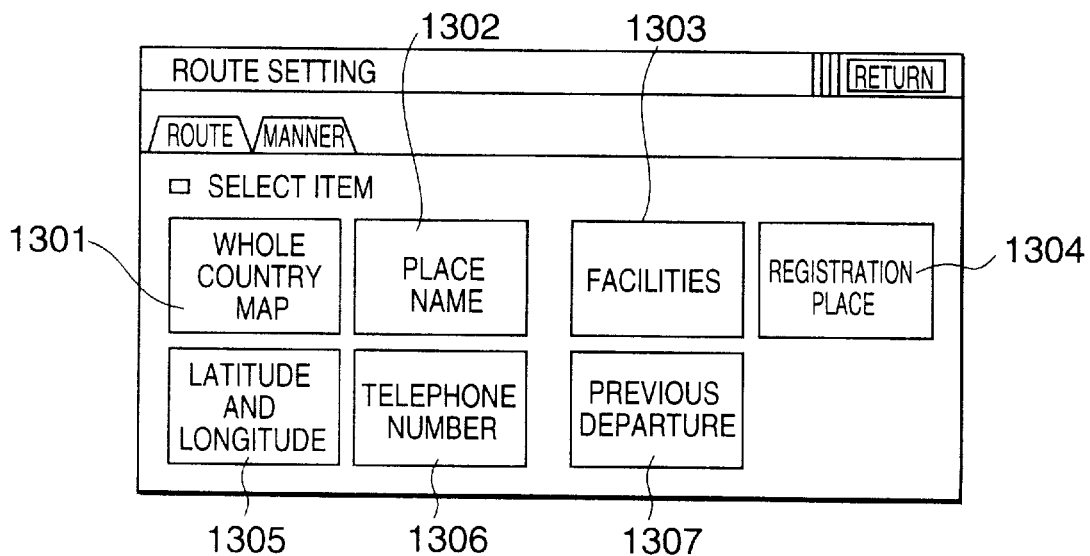
FIG. 13 is a diagram showing an example of the image displayed on the screen of the display according to the embodiment of the present invention.

As shown in FIG. 13, a "whole country map" button 1301, a "place name" button 1302, a "facilities" button 1303, a "registration place" button 1304, a "latitude and longitude" button 1305, "a telephone number" button 1306 and a "previous departure place" button 1307 are displayed on a display frame 1300. The driver can select any one of the above buttons by pushing his/her desired button. For example, if the driver pushes the "whole country map" button 1301, the map of a required area (for example, the whole map of Japan) is displayed on the screen of the display 17 through the operation of the switch signal accept/analysis unit 32 and the map read-in instructor 36, and the driver is allowed to specify the name and position of a prescribed place through a cursor. Further, with respect to "place name", the driver can specify the name and position of his/her desired place by successively selecting each of layers corresponding to areas, urban and rural prefectures, cities, towns and villages. In addition, with respect to "facilities", the driver can specify the name and position of his/her desired place by successively selecting each of layers corresponding to a category, an area and urban and rural prefectures.

Figures 14, 15:
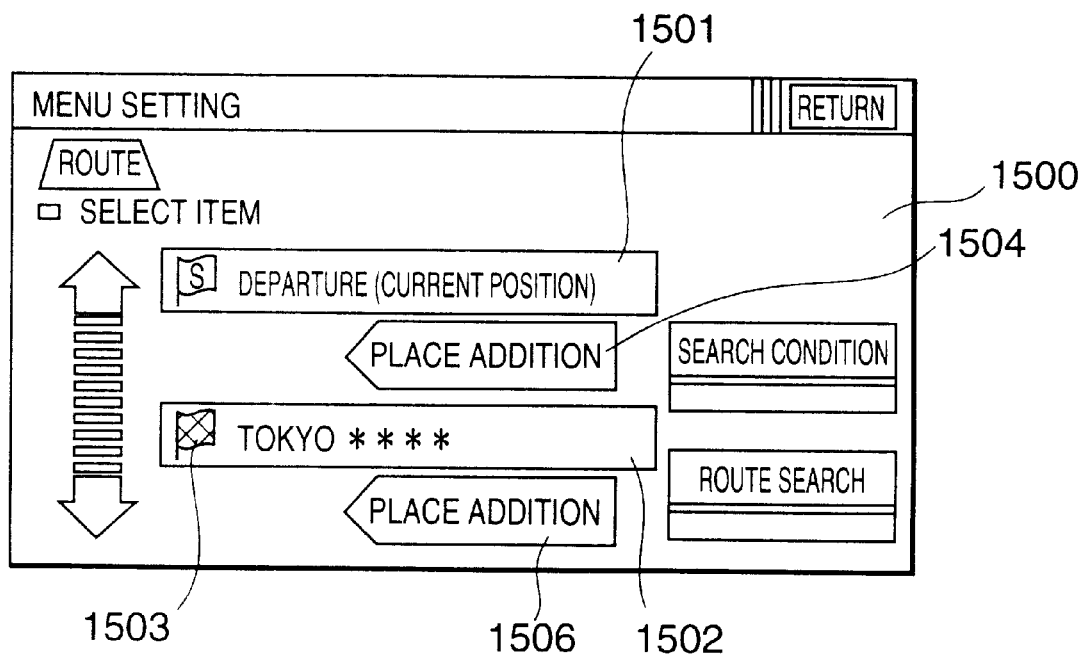
FIG. 14 is a diagram showing a destination/via-place table according to the embodiment of the present invention.
FIG. 15 is a diagram showing an example of the image displayed on the screen of the display according to the embodiment of the present invention.

When a desired place is selected, the coordinate data of the selected place, etc. are read out from the CD-ROM 15 under the control of the map read-in instructor 36 (step 1103), and the place name data representing the name of the place and the coordinate data representing the position thereof are stored in the destination/via-place table ensured in a predetermined area of the memory 25 (step 1104). FIG. 14 shows the destination/via-place table. As shown in FIG. 14, respective pairs of the place name data representing the names of places and the coordinate data representing the positions of the places are stored in association with numbers in the destination/via-place table. In this embodiment, six pairs of place name data and coordinate data can be stored. Of these pairs, the data pair at the most downstream side of the table, that is, the data pair associated with the largest number represents the destination, and the other data pairs associated with the other numbers represent via-places through which a route passes until it reaches the destination. As described later, a guide route which successively passes through the via-places in the numerically increasing order of the via-places is searched.

In the new formation processing, only the data pair corresponding to "first" is stored in the destination/via-place table.

If the judgment in step 1001 of FIG. 10 is NO (N), under the control of the destination/via-place setting unit 33, the destination/via-place table is read out to output necessary data to the display processor 23, whereby the place name of a departure point (see reference numeral 1501 of FIG. 15) and the place name of a via-place or destination (see reference numeral 1502) are displayed on the screen 1500 of the display 17. As described above, in the destination/via-place table, the data pair associated with the largest number is relevant to the destination. Accordingly, the destination/via-place setting unit 33 notifies the name on the existing data pair located at the most downstream side of the table (the data pair associated with the largest number) to the display processor 23, whereby the name of the destination is added with a mark indicating the destination (in FIG. 15, a checker flag 1503).

As shown in FIG. 15, place addition buttons 1504, 1506 are provided to add a new place between places which have been already set. For example, in FIG. 15, since a place displayed in a column 1502 corresponds to a destination, the place to be added at the position of the addition button 1504 may become a via-place or the place to be added to the position of the addition button 1505 may become a new destination.

When the driver pushes some addition button, it is judged in step 1004 that the processing type is "addition", and the processing goes to step 1005, thereby executing the processing of selecting the name of a place to be added to the position corresponding to the pushed addition button. This is substantially the same as the step 1102 of FIG. 11. That is, the "whole country map" button 1301, the "place name" button 1302, the "facilities" button 1303, etc. are displayed on the display frame 1300 of FIG. 13, and the driver can select the name of a desired place by pushing his/her desired button and further successively pushing the buttons in images which are hierarchically displayed.

When the selection of the place point in step 1005 is completed, the destination/via-place table is referred to and it is checked whether there exists data at a more downstream side of the position of the place to be newly added in the table, that is, the data corresponding to a number larger than the number to be associated to the place to be newly added (step 1006). If the judgment in step 1006 is YES (Y), the data corresponding to the numbers which are equal to or larger than the number allocated to the place to be newly added are shifted to the downstream side one by one (step 1007).

Subsequently, the coordinate data of the selected place are read out from the CD-ROM 15 under the control of the map read-in instructor 36, and the data thus read out are stored at a predetermined position in the destination/via-place table (step 1008), whereby the data associated with the largest number are associated with the destination (step 1009). Subsequently, the image corresponding to the new destination/via-place table is displayed on the screen of the display 17 (step 1010).

Figure 16:
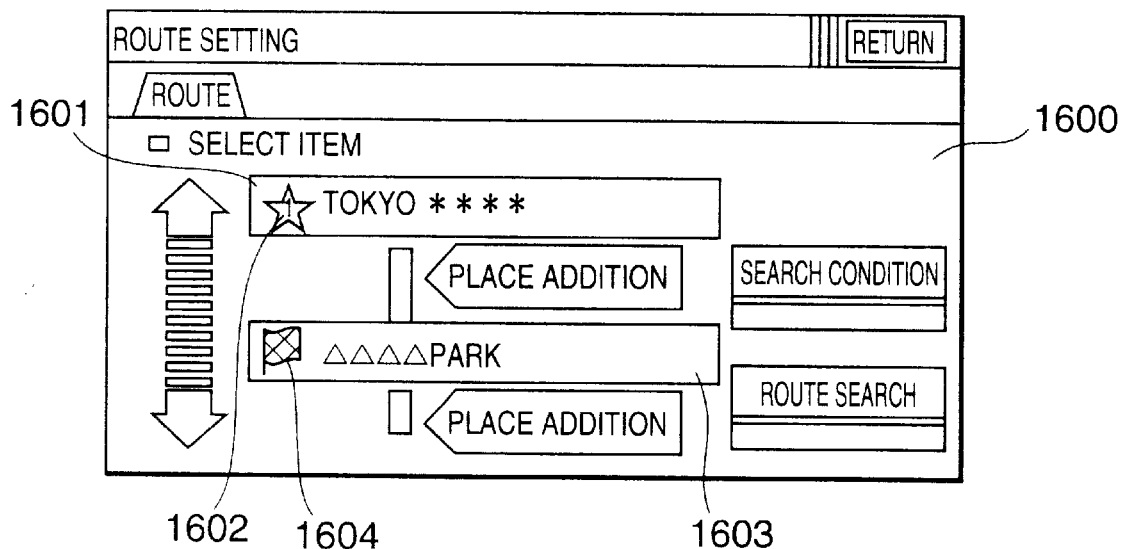
FIG. 16 is a diagram showing an example of the image displayed on the screen of the display according to the embodiment of the present invention.

For example when a new place is added at the position of the addition button 1506 in FIG. 15, the driver operates various switches and buttons to thereby obtain an image shown in FIG. 16 on the screen of the display 17. In FIG. 16, a place (reference numeral 1601) "Tokyo ****" which was a destination before the processing is set as a via-place after the processing, and a star mark 1602 containing a numeral "1" therein which indicates a first via-place is added in a column 1601. Further, a place (reference numeral 1603) "△△△△ park" which is a newly added is set as a destination, and a checker flag 1604 is added to a column 1603.

Figure 17:
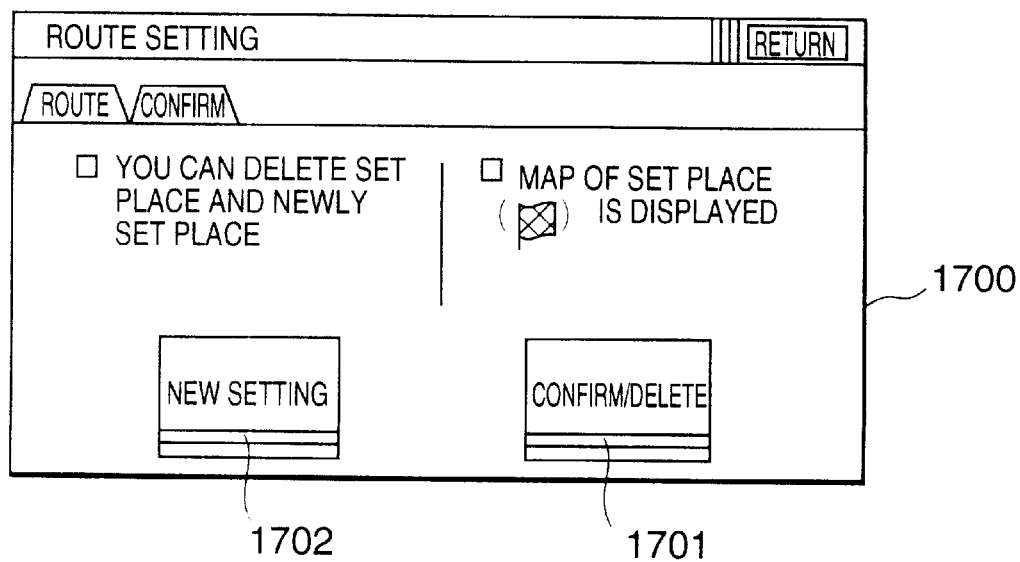
FIG. 17 is a diagram showing an example of the image displayed on the screen of the display according to the embodiment of the present invention.

When the column 1601 indicating a via-place or the column 1603 indicating a destination in the image shown in FIG. 16 is pushed, the image shown in FIG. 17 is displayed on the screen of the display 17. Here, when the driver pushes a "confirm/delete" button 1701, it is judged in step 1004 of FIG. 10 that the processing type is "delete", and then the processing goes to step 1011.

Subsequently, under the control of the destination/via-place setting unit 33 and the map read-in instructor 36, the map data of the periphery of the via-place or destination thus selected is read out from the CD-ROM 15, and displayed through the display processor 23 on the screen of the display 17 (step 1011). This image contains a button indicating whether it should be deleted or not.

Further, when the driver pushes a button for permitting deletion, a pair of the corresponding place name data and coordinate data in the destination/via-place table is deleted, and the data located at the downstream side, that is, the data corresponding to the numbers larger than the number of the deleted data are shifted one by one (step 1012), whereby the data of the destination/via-place table are rewritten. Thereafter, the processing goes to step 1009, and the data pair located at the most downstream side, the data pair corresponding to the largest number is relevant to the destination.

Figure 18:
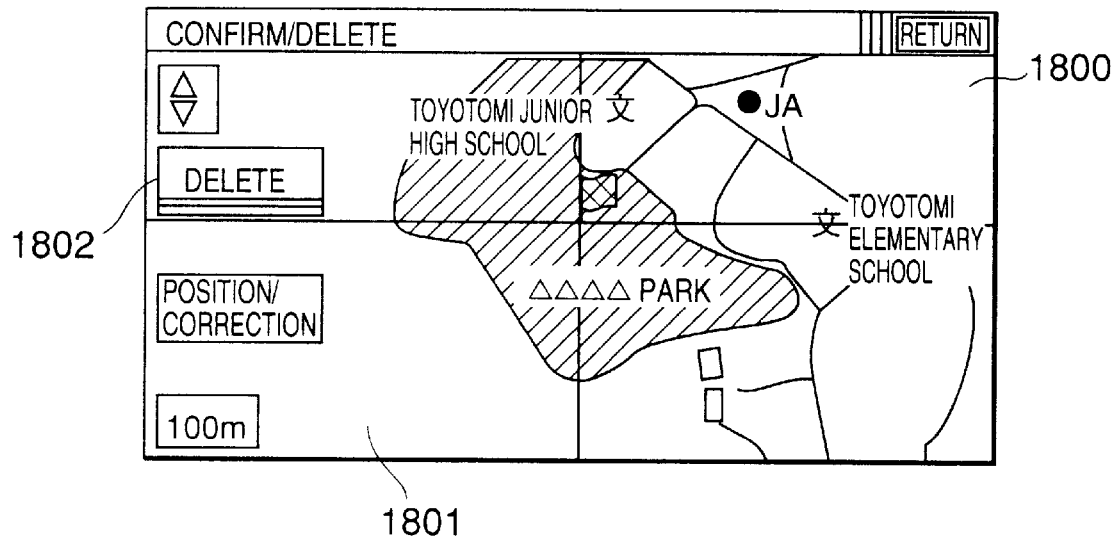
FIG. 18 is a diagram showing an example of the image displayed on the screen of the display according to the embodiment of the present invention.
Figure 19:
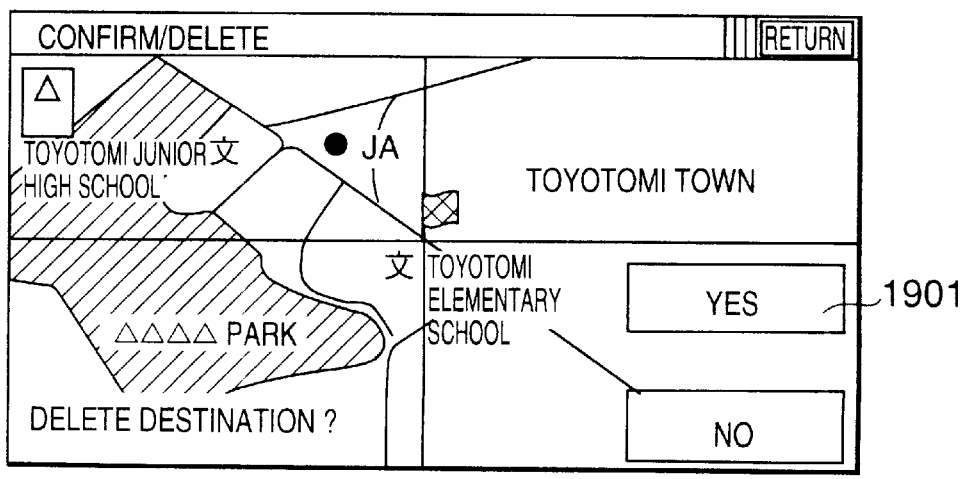
FIG. 19 is a diagram showing an example of the image displayed on the screen of the display according to the embodiment of the present invention.

For example, when the column 1604 is pushed in FIG. 16, a map of the periphery of the place described in the column 1604 and the "delete" button 1802 for instructing deletion are displayed on the display frame 1800 of the display 17 as shown in FIG. 18. Further, when the "delete" button 1802 is pushed by the driver, an image shown in FIG. 19 is displayed, and a specified place is deleted by pushing a button 1901.

When the driver pushes a "new setting" button 1702 in the image of FIG. 17, it is judged in step 1004 of FIG. 10 that the processing type is "correction", and the processing goes to step 1013. In the step 1013, the place written in the previously-pushed column (for example, the column 1601 or the column 1603 in FIG. 16) is specified. Subsequently, the processing of newly selecting the name of a place is executed (step 1014). This processing is substantially the same as the step 1102 of FIG. 11. That is, the "whole country map" button 1301, the "place name" button 1302, the "facilities" button 1303, etc. are displayed on the display frame 1300 shown in FIG. 13. The driver can select the name of a desired place by pushing a desired button and successively pushing buttons in images which are hierarchically displayed. When the selection of the place name in the step 1014 is completed, the corresponding data pair is rewritten in the destination/via-place table.

Subsequently, the processing goes to step 1010 to display on the screen of the display 17 an image which is based on the rewritten data in the memory.

When the destination/via-place setting processing shown in the step 706 of FIG. 7 is completed, the route search processing is executed (step 707). Through the route search processing, a guide route which passes through the places represented by the data stored in the destination/via-place table in the numerical order and extends to the final destination is obtained. The search of the guide route may be performed by using a well-known method (for example, Dijkstra's Algorithm).

Figure 20:
FIG. 20 is a diagram showing an example of the image displayed on the screen of the display according to the embodiment of the present invention.

Next, the processing (step 708) when the "registration place setting" button 902 is pushed in the step 705 of FIG. 7 will be described hereunder. In this case, the registration place setting unit 35 is started, and an image shown in FIG. 20 is displayed on the screen of the display 17. In FIG. 20, registration places which have been already set are written in columns 2001, 2002. Further, the registered place table is ensured in the predetermined area of the memory 25, and the name data representing the names of registered places and the coordinate data representing the positions thereof are stored in association with the numbers in the registered place table.

Figure 21:
FIG. 21 is a diagram showing an example of the image displayed on the screen of the display according to the embodiment of the present invention.

When the driver pushes a column in which "no set" is written (for example, a column 2003), an image shown in FIG. 13 is displayed on the screen of the display 17. The driver can select the name of a desired place by pushing a desired button and further successively pushing buttons in images which are hierarchically displayed. This processing is substantially the same as the processing of the step 1102 of FIG. 11. After the name data and the coordinate data of a new registered place are stored in the registered place table, an image containing a column in which a new registered place is written is displayed on the screen of the display 17 as shown in FIG. 21.

Further, when another button is pushed in the step 705 of FIG. 7, the necessary processing is also executed in step 709. For example, after a "guide information" button 903 is pushed, the buttons displayed on the display frame are successively pushed, thereby obtaining information on facilities, leisure facilities, lodgings, restaurants, etc. around the current position of the vehicle.

Next, the operation when a switch other than the menu switch is pushed in the step 703 of FIG. 7 will be described. When the "place registration" switch is pushed, the processing of the step 710 is executed. In this processing, the registration place setting unit 35 accepts the current position data representing the current position of the vehicle from the current position calculator 31, and also accepts the data representing the name of the place at the current position from the map read-in instructor 36. If the current position is a place such as a crossing, facilities or the like which can be uniquely specified, the name of that place is set as the place name, and in other cases the name of an administrative district (in the vicinity of street) is set as the place name. Subsequently, in step 708**, the name data representing a name and the position data representing the position thereof are stored in association with a predetermined number in the registration place table.

Next, the destination setting processing (step 711 of FIG. 7) will be described. In this case, the driver operates a joy stick contained in the switch 14 to display a map containing the point corresponding to his/her desired destination. Subsequently, the driver pushes the "destination setting" switch so that the point displayed at the center is set as the destination. More specifically, when the driver pushes the "destination setting" switch, the destination/via-place setting unit 33 accepts the name data and coordinate data of the point at the center of the map displayed on the screen of the display 17 from the map read-in instructor 36. Subsequently, the pair of the name data and the coordinate data thus obtained are stored into the destination/via-place table so as to be associated with the smallest unused number. Accordingly, the point which is set by the operation of the "destination setting" switch is set as the destination. When this processing is completed, the route search processing is executed in step 707. As described above, the guide route passing through the set via-places to the destination can be obtained.

Figure 22:
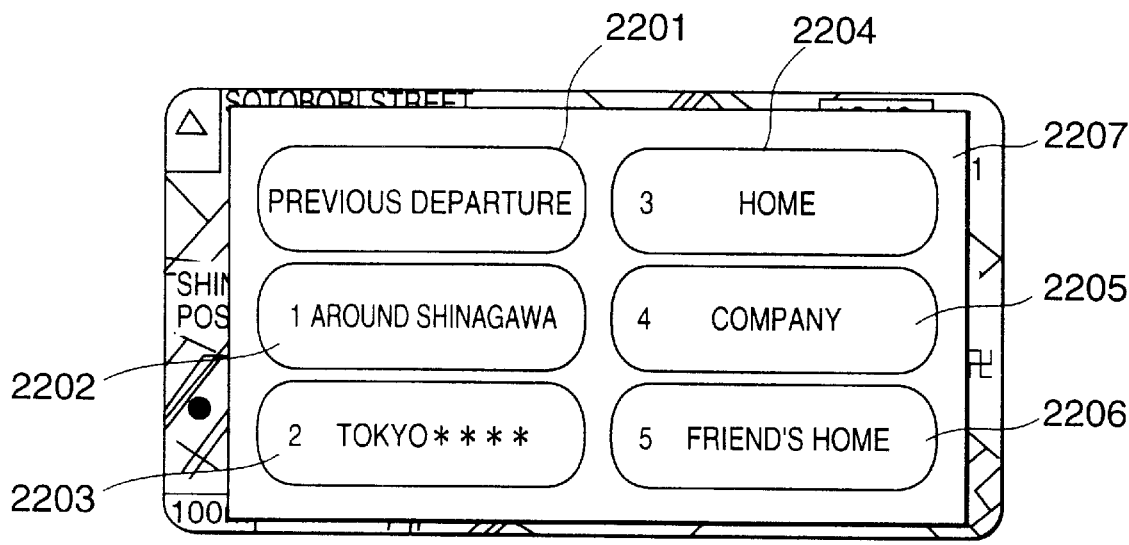
FIG. 22 is a diagram showing an example of the image displayed on the screen of the display according to the embodiment of the present invention.

Further, if it is determined that the "registration place route search" switch is pushed in step 703 of FIG. 7, the processing of the step 712 would be executed. In step 712, under the control of the registration place setting unit 35 the registration place table is referred to and the data pair comprising the name data and the coordinate data corresponding to a prescribed number is read out from the registration place table. In this embodiment, five pairs of corresponding name data and coordinate data are read out in the numerically increasing order. Further, the name data and the coordinate data of the previous departure stored in a predetermined area of the memory 25 are read out by the registration place setting unit 35. These data thus read out are supplied to the display processor 23, and an image in which these registration places, etc. are superposed on a map is displayed on the screen of the display 17. FIG. 22 shows an image displayed on the display as described above. As shown in FIG. 22, a window 2207 containing a "previous departure" button 2201 and five buttons 2202 to 2206 on which the names of registration places are written is displayed on the screen.

When the driver pushes some button of the above buttons, the processing of the step 707 is executed to search a guide route extending from the current position to a point selected from the previous departure and the five registration places. Accordingly, by setting frequently-visiting places as registration places, a guide route extending to a destination can be easily searched without any cumbersome operation to select the destination. Since there often occurs a case where the previous departure is set as a next destination, the "previous departure" button 2201 is provided in the window so that a route to the previous departure can be searched.

According to this embodiment, when the driver wishes to add a via-place or the like, the driver pushes a column (button) corresponding to a position at which a point is to be added on a display frame in which a destination and/or a via-place is displayed, and then selects the name of the point, whereby the constant of the destination/via-place table is rewritten by the destination/via-place setting unit. Therefore, the driver can set via-places in his/her desired order or set a desired destination without any cumbersome operation.

Further, according to this embodiment, by setting a registration place in advance, a guide route to a desired registration place can be obtained with a simple operation.

Still further, according to this embodiment, a via-place and a destination can be more easily set in the processing executed by the destination/via-place setting unit 33 according to the following procedure.

As described above, in the step 1005 of FIG. 10, the name of a point to be added is selected for the position corresponding to the pushed addition button. In the following description, a case where the "registration place" button 1304 or the "previous departure" button 1307 displayed on the display frame 1300 of FIG. 13 is pushed will be described.

Figure 23:
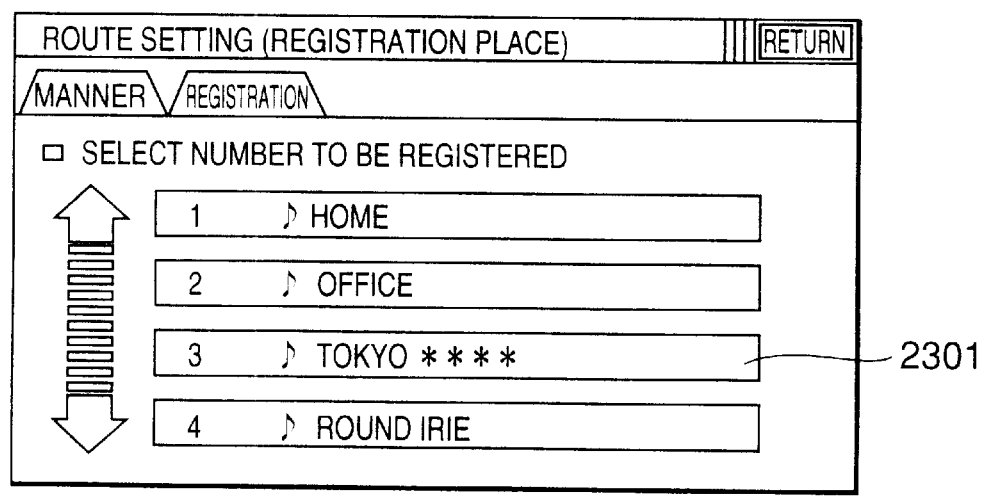
FIG. 23 is a diagram showing an example of the image displayed on the screen of the display according to the embodiment of the present invention.

When the driver pushes the "registration place" button 1304, under the control of the destination/via-place setting unit 33, the registration place table is referred to and the data pair comprising the name data and the coordinate data which are associated with a prescribed number are read out and supplied to the display processor 23. In FIG. 23, the registration places which are associated with the numbers of 1 to 4 in the registration places are displayed on a display frame 2300 of the display 17. It is needless to say that the registration place associated with the number of 5 or 6 can be displayed by operating the switch 14 such as a joy stick or the like.

Figure 24:
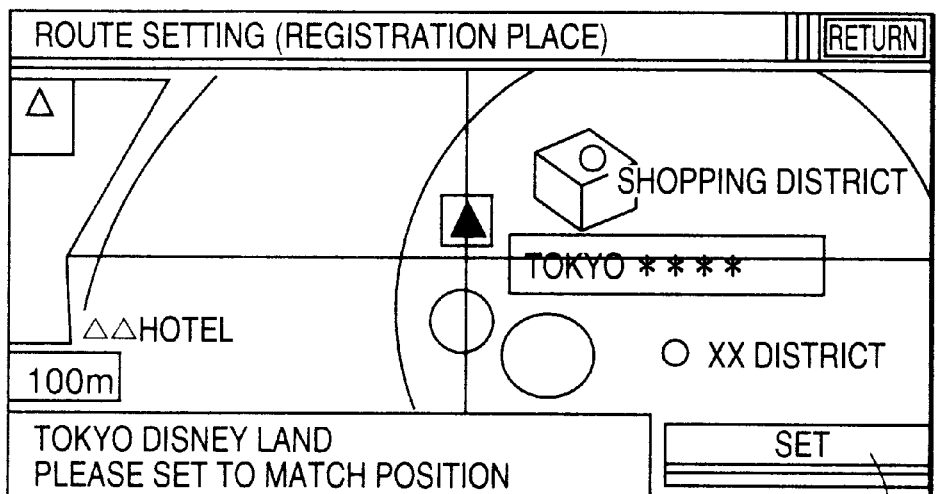
FIG. 24 is a diagram showing an example of the image displayed on the screen of the display according to the embodiment of the present invention.

When the driver selects any one of the registration places thus displayed, the setting of a point to be newly added is completed. That is, in order to set a point to be added, it is unnecessary to successively push the buttons in images which are hierarchically displayed, and it is sufficient to perform only an operation of selecting the registration place. For example, when the column 2301 is selected in FIG. 23, the map data of the point written on the column 2301 is read out from the CD-ROM 15, and displayed on the screen of the display 17 as shown in FIG. 24. Subsequently, in response to the driver's pushing operation of a "set" button 2401, the registration place is set at the point to be added. This operation is particularly effective to a case where the driver sets the registration place as a frequently-visiting place and wishes to obtain a guide route extending to the place.

Figure 25:
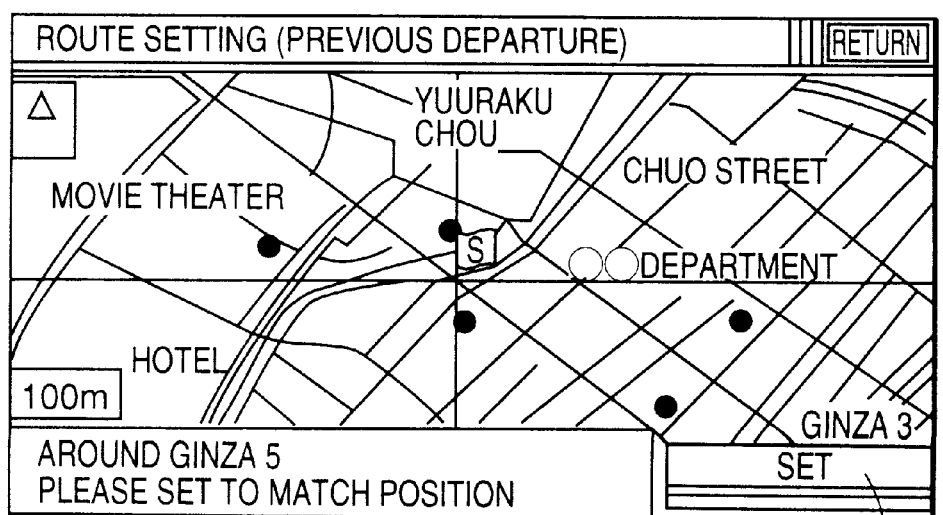
FIG. 25 is a diagram showing an example of the image displayed on the screen of the display according to the embodiment of the present invention.

When the driver pushes the "previous departure" button 1307, the name data and the coordinate data of the previous departure stored in a prescribed area of the memory 25 are read out under the control of the destination/via-place setting unit 33, and the map data of this point is read out from the CD-ROM 15 to display the corresponding map on the screen of the display 17 (see FIG. 25). For example, the driver sets the previous departure to the point to be added by pushing the "set" button 2401.

The present invention is not limited to the above embodiment, and various modifications may be made to the above embodiment within the scope of the claims described later. It is needless to say that these modifications are contained in the subject matter of the present invention.

For example, in the above embodiment, the azimuth of the vehicle is measured by using the angular speed sensor and the geomagnetic sensor, and the travel distance of the vehicle is measured by using the vehicle speed sensor. The current position of the vehicle is determined on the basis of the above measured data. However, the present invention is not limited to the above embodiment. For example, a GPS (Global Positioning System) receiver may be provided to obtain the current position of the vehicle on the basis of radio wave from satellites.

Further, in the above embodiment, the map displayed on the display is two-dimensional, that is, it is a two-dimensional map. However, the present invention is not limited to the above embodiment. For example, when it is a birds-eye view map obtained by viewing a two-dimensional map from the sky or the map data contains data representing a height from sea level, the map may be a stereoscopic map.

In this embodiment, the switch group contains a touch panel provided on the front face of the display and switches provided on the main body side of the navigation device, however, only one of them may be provided.

The term "means" (or unit) in the specification does not necessarily mean physical means, but it covers a case where the function of each means is implemented by a software. Further, the function of one means or member may be implemented by two or more physical means or members, or the functions of two or more means or units may be implemented by one means or unit.

As described above, according to the present invention, there can be provided an in-vehicle mount type navigation device with which a user can freely set a desired destination or via-places through which a route to the destination passes.

Further, according to the present invention, there can be provided an in-vehicle mount type navigation device with which a route search to a desired destination can be performed without any cumbersome operation.

What is claimed is:

1. An in-vehicle mount type navigation device comprising map data read-out means for reading out map data from a map data storage medium, current position calculating means for calculating a current position of a vehicle, display means for displaying the current position with the map, input means for accepting instructions from a user, and guide route calculating means for calculating a guide route from the current position to a destination, further comprising:

destination/via-place storage means for storing data representing the destination and via-places through which a route extending to the destination passes;

added position setting means for setting an added position after the destination, between the via-places, or between the destination and the via-place just before the destination;

place specifying means for specifying a place of the added position set by said added position setting means; and destination/via-place control means for storing into said destination/via-place storing means data representing the place specified by said place specifying means in association with the added position set by said added position setting means;

wherein said added position setting means displays on said display means, an image representing candidates for the added position with the via-places and the destination, each of said candidates being located after the destination, between the via-places, or between the destination and the via-place just before the destination, said the via-places and the destination being arranged in passing order on the basis of the data stored in said destination/via-place storing means, and accepts a selection of one out of the candidates from the user through said input means to set the selected candidate as the added position;

wherein said place specifying means determines a place name and a coordinate value according to instructions from the user through said input means to specify the place of the added position set by said added position setting means;

wherein said guide route calculating means calculates, referring to the map data, said guide route which successively passes through the via-places in passing order on the basis of the data stored in said destination/via-place storage means; and when the candidate located between the via-places or between the destination and the via-place just before the destination is set as the added position by said added position setting means, said destination/via-place control means stores data representing the place of the added position specified by said place specifying means as data representing a new via-place to be passed between the via-places or between the destination and the via-place just before the destination, and when the candidate located after the destination is set as the added position by said added position setting means, said destination/via-place control means changes data representing the destination to data representing a new via-place to be passed just before a new destination, and stores data representing the place of the added position specified by said place specifying means as data representing the new destination.

2. An in-vehicle mount type navigation device according to claim 1, wherein said destination/via-place control means stores into said destination/via-place storage means the data representing the destination and the via-places in association with numbers in passing order so that the destination is associated with the largest number.

3. An in-vehicle mount type navigation device according to claim 1, wherein said place specifying means accepts a selection of one out of beforehand-registered places from the user through said input means to specify the place of the added position set by said added position setting means.

4. An in-vehicle mount type navigation device according to claim 1, wherein said place specifying means displays the map on said display means, accepts an indication of a place on the map from the user through said input means, and determines a place name and a coordinate value of the place on the map on the basis of the map data to specify the place of the added position set by said added position setting means.

* * * * *